(12) United States Patent
Klopp et al.

(10) Patent No.: US 7,713,311 B2
(45) Date of Patent: May 11, 2010

(54) LIQUID DIRECT DYE FORMULATIONS

(75) Inventors: Ingo Klopp, Weisenheim (DE); Karl-Heinz Etzbach, Frankenthal (DE); Helmut Reichelt, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 171 days.

(21) Appl. No.: 12/093,396

(22) PCT Filed: Nov. 13, 2006

(86) PCT No.: PCT/EP2006/068376

§ 371 (c)(1), (2), (4) Date: May 12, 2008

(87) PCT Pub. No.: WO2007/057370

PCT Pub. Date: May 24, 2007

(65) Prior Publication Data

US 2008/0295262 A1  Dec. 4, 2008

(30) Foreign Application Priority Data

Nov. 18, 2005 (EP) .................................. 05025196

(51) Int. Cl.
*C09B 67/36* (2006.01)

(52) U.S. Cl. ........................ 8/641; 8/611; 8/602; 8/604; 8/638; 8/669; 8/666; 8/681; 8/682; 8/687

(58) Field of Classification Search ...................... 8/611, 8/602, 604, 638, 641, 669, 666, 681, 682, 8/687

See application file for complete search history.

(56) References Cited

U.S. PATENT DOCUMENTS

| | | | |
|---|---|---|---|
| 4,725,849 A * | 2/1988 | Koike et al. | 347/106 |
| 5,041,539 A | 8/1991 | Tzikas et al. | |
| 7,160,336 B2 | 1/2007 | Nordmann et al. | |
| 7,331,998 B2 | 2/2008 | Decker et al. | |
| 2003/0052952 A1 * | 3/2003 | Tanabe et al. | 347/100 |
| 2005/0132510 A1 * | 6/2005 | Decker et al. | 8/478 |
| 2006/0052590 A1 | 3/2006 | Schmitt et al. | |
| 2007/0232795 A1 | 10/2007 | Schroder et al. | |

FOREIGN PATENT DOCUMENTS

| | | |
|---|---|---|
| DE | 30 46 450 A1 | 8/1981 |
| EP | 0 122 224 | 10/1984 |
| EP | 0 182 743 | 5/1986 |
| EP | 1 258 562 A2 | 11/2002 |
| EP | 1258562 * | 11/2002 |
| EP | 1 548 069 A1 | 6/2005 |
| EP | 1 632 535 A1 | 3/2006 |
| GB | 2 164 348 A | 3/1986 |
| GB | 2164348 * | 3/1986 |
| WO | WO 2004/048478 A1 | 6/2004 |
| WO | WO 2005/113681 A1 | 12/2005 |

* cited by examiner

*Primary Examiner*—Lorna M Douyon
*Assistant Examiner*—Amina Khan
(74) *Attorney, Agent, or Firm*—Oblon, Spivak, McClelland, Maier & Neustadt, L.L.P.

(57) ABSTRACT

The present invention relates to aqueous liquid formulations comprising
5-30% by weight of a dye composition comprising
    25-85% by weight of Direct Brown 44
    15-75% by weight of Direct Yellow 11 and/or of a dye obtainable by reduction or thermal treatment of Direct Yellow 11
    0-15% by weight of one or more blue direct dyes and
    0-10% by weight of one or more red direct dyes
    all based on the dye composition
0.5-15% by weight of one or more alkylamines whose one, two or three alkyl radicals may each be substituted by one or two hydroxyl groups and/or amino groups and/or interrupted by one or two oxygen atoms in ether function,
based on the total weight of the aqueous liquid formulation, the sodium content of the liquid formulation not exceeding 0.3% by weight, and also their use for dyeing cellulose material especially paper.

8 Claims, No Drawings

LIQUID DIRECT DYE FORMULATIONS

The present invention relates to aqueous liquid formulations comprising 5-30% by weight of a dye composition comprising
    25-85% by weight of Direct Brown 44
    15-75% by weight of Direct Yellow 11 and/or of a dye obtainable by reduction or thermal treatment of Direct Yellow 11
    0-15% by weight of one or more blue direct dyes and
    0-10% by weight of one or more red direct dyes
    all based on the dye composition
0.5-15% by weight of one or more alkylamines whose one, two or three alkyl radicals may each be substituted by one or two hydroxyl groups and/or amino groups and/or interrupted by one or two oxygen atoms in ether function, based on the total weight of the aqueous liquid formulation, the sodium content of the liquid formulation not exceeding 0.3% by weight, and also their use for dyeing cellulose material especially paper.

The manufacture of packaging material requires brown dyes having a light brown hue which only varies within narrow limits. The brown dye can be a synthesized mixture of dyes, as in the case of Basic Brown 1, or a blended mixture of a yellow dye, a blue dye and if appropriate a red dye. Blended dye mixtures have the great advantage that it is easier to shade the hue. It is more difficult, however, to obtain storage-stable liquid formulations of these blended dye mixtures.

Poor stability of a liquid formulation in storage results from the often limited solubility of dyes in water, since limited solubility in water is usually in turn associated with a desired high affinity for fiber. While this is of no consequence for the dye concentration in the papermaking machine because the concentration is low, it can have immense consequences for the commercially ever more popular liquid formulations. The poor storage stability of the liquid formulation often gives rise to problems when the drums have to be stored for a prolonged period. During this period, both low and high temperatures can lead to precipitates which can be critical for metering pumps but can also lead to specks or nonuniform colorations on paper. Storage stability is even more problematical in the case of a blended dye mixture, since in this case more than one dye has to be kept in solution at one and the same time.

Dye formulation solubility is generally improved by addition of solubility improvers which often also serve as a counter-ion to the dye acids. Known solubility improvers come from a wide range of chemical classes such as alcohols, mono-, oligo- or polyalkylene glycols, lactams, amines and amides.

EP 1 258 562 describes blended brown mixtures comprising Direct Yellow 11 and also other blended mixtures comprising Direct Brown 44.

GB-A 2 164 348 teaches storage-stable liquid formulations of Direct Yellow 11 through its reaction with di- and triethanolamine.

DE-A 30 46 450 reveals the preparation of Direct Yellow 11 from 4-nitrotoluene-2-sulfonic acid in the presence of ethanolamine and lithium hydroxide. The mixture is subsequently admixed with urea.

EP-A 1 548 069 describes yellow and brown storage-stable aqueous liquid formulations of reddened Direct Yellow 11 and also red and blue direct dyes comprising ethanolamine and urea. The mixtures described therein, however, are not shaded with browns.

Prior European patent application 05016961.4 teaches the storage stabilization of anionic direct dyes with poly-N-vinylformamide and polymers of N-vinylformamide. The brown mixtures described therein are partly also shaded with Direct Brown 44. No data are provided on sodium content. Storage tests have revealed unsatisfactory results with regard to long term storage stability, since these mixtures exhibit structural viscosity in the long term test.

WO-A 04/048478 teaches the production of a low-salt liquid formulation of Direct Brown 44 proceeding from m-phenylenediamine to vesuvin and direct conversion to Direct Brown 44 without intervening isolation of the vesuvin. The Direct Brown 44 is isolated in its acid form and dissolved in aqueous bases.

Prior PCT application PCT/EP/05/005392 describes the production of low-salt liquid formulations of Direct Brown 44 by means of nanofiltration.

It would be desirable, then, to be able to offer ready-blended brown mixtures to paper manufacturers specific to their respective raw pulps for the manufacture of packaging material. This would be beneficial to each paper manufacturer because they would no longer have to self-mix and would only have to store one brown dye mixture in the future. So the storage stability of brown aqueous liquid formulations is the essential concern of the present invention.

The present invention thus has for its object a brown liquid formulation that possesses improved stability in storage both at low and at high temperatures.

We have found that this object is achieved by the above-mentioned liquid formulations.

The weight %ages reported for dyes are each based on the dye reckoned in the form of its free acid. The dyes are present in the liquid formulation in the form of their salts. Direct Yellow 11, the dyes obtained by its conversion and also the red and blue direct dyes preferably have lithium ions and also alkylammonium ions as counter-ions. Since one cannot tell from the liquid formulation whether the alkylamine is counter-ions or additives, they are reckoned in their totality as alkylamine in the liquid formulation.

Vesuvin and its coupling products such as C.I. Direct Brown 44 have been known since the beginning of dye chemistry. For instance, the Colour Index shows that C.I. Direct Brown 44 is obtained by formally coupling two parts of sulfanilic acid onto one part of vesuvin (Bismarck Brown C.I. 21000). A process for its production is described in WO 04/048478, the teaching of which is hereby expressly incorporated herein.

Preference is given to Direct Brown 44, which is obtained by preparing Vesuvin from m-phenylenediamine and converting it to Direct Brown 44 without intervening isolation. The vesuvin is prepared in a commonly known manner, as also described in WO 04/048478, by formally tetrazotizing one of three parts of m-phenylenediamine and allowing it to couple onto the other two parts. The reaction mixture can then be directly admixed with the diazotized sulfanilic acid.

Preference is given to using Direct Brown 44 as a liquid formulation obtained for example by isolating the acid of Direct Brown 44 and dissolving it in dilute bases. Isolation in its acid form is accomplished by the reaction mixture of the coupling of sulfanilic acid onto vesuvin being acidified to a pH in the range from 0 to 4.5 and preferably in the range from 0 to 2 after coupling has taken place. It may be preferable for the acid of Direct Brown 44 to be allowed to crystallize at temperatures in the range from 20 to 70° C. This gives Direct Brown 44 as a solid, which can be isolated in a generally customary manner such as filtration or centrifugation. Preferably, the dye obtained is washed with water until the conductivity of the wash liquor is ≦1 mS (millisiemens). Direct Brown 44 acid is subsequently dissolved in dilute bases. The choice of base dictates which salt of the dye is obtained.

Useful bases have cations which, as counter-ions, keep the dyes in solution, such as ammoniacal water or aqueous solutions of substituted amines such as monoalkyl-, dialkyl- or trialkylamines, tetraalkylammonium or benzyltrialkylammonium hydroxides or such amines as are derived from nitrogenous five- or six-membered saturated heterocycles, such as pyrrolidine, piperidine, morpholine or piperazine or their N-monoalkyl- or N,N-dialkyl-substituted products. Alkyl is here to be understood as meaning in general straight-chain or branched $C_1$-$C_{20}$-alkyl, which may be substituted by one or two hydroxyl groups and/or interrupted by one to four oxygen atoms in ether function. Preferred bases are $C_1$-$C_4$-alkanolamines, especially monoethanol-, diethanol- and triethanolamine.

It is preferable to dissolve the dye with ammoniacal water in admixture with an alkylamine whose alkyl radical may be substituted by one or two hydroxyl groups and/or amino groups and/or interrupted by one or two oxygen atoms in ether function. Particular preference is given to ammoniacal water in mixture with a monoalkanol-, dialkanol- and/or trialkanolamine, since these provide particularly stable liquid formulations. Alkyl here is to be understood as preferably straight-chain or branched $C_1$-$C_4$-alkyl. Especially ammoniacal water combined with mono-, di- and/or triethanolamine is preferred. Ammoniacal water is a 20-30% by weight solution of ammonia in water.

In a further preferred embodiment, the dye is dissolved in the alkylamine only.

To neutralize and hence dissolve the dye, 0-2 mol of ammoniacal water are used per mole of dye. To dissolve any remaining dye, alkylamine is chosen as base. It may further be preferable to additionally add up to 3 mol equivalents of alkylamine to improve the stability of the liquid brand. The value to which the pH is adjusted is preferably in the range of 8.5-11.

Preference is given to employing Direct Brown 44 as a liquid formulation having a sodium content ≦1.5% by weight and more preferably ≦0.7% by weight based on Direct Brown 44 solid.

A further preferred embodiment utilizes Direct Brown 44 obtained by coupling an at least equimolar amount of diazotized sulfanilic acid onto the coupling product of phenylenediamine onto itself, by dissolving the as-formed Direct Brown 44 in a basic medium and subsequently subjecting the solution to a nanofiltration. The dyes are produced as solids under coupling conditions, so that an aqueous suspension is obtained. "Dissolving in a basic medium" is to be understood as meaning that the azo dye is dissolved by basifying the pH of the reaction mixture, i.e., adjusting the pH of the reaction mixture to a value in the range from 8 to 14. The above-recited bases are useful for dissolving Direct Brown 44, with the same preferences.

A subsequent nanofiltration serves to desalt and if appropriate concentrate the dye solution. Preferred membranes utilized in the membrane separation unit employed are commercially available nanofiltration membranes having molecular weight cutoffs of 200 daltons to 2000 daltons and more preferably 200 daltons to 1000 daltons. Transmembrane pressures range from 1 to 50 bar at temperatures up to 100° C. Useful membranes for nanofiltration are described in PCT/EP/05/005392, expressly incorporated herein by reference.

Dissolving the dye in a basic medium generally produces a dye solution whose dye content is in the range from 3% to 10% by weight. Such a solution can be directly desalted (and if appropriate concentrated) by nanofiltration.

Desalting is carried on until the sodium content of the liquid formulation is ≦1.5% by weight and more preferably ≦0.7% by weight based on Direct Brown 44 as a solid.

Preferably, a portion of the removed permeate is, as in a diafiltration, replaced by an aqueous solution of the above-mentioned bases in order that the pH may be kept constant. This procedure is described in PCT/EP/05/005392, the disclosure content of which is expressly incorporated herein by reference.

Direct Yellow 11 is obtained as a product of self-condensation of 5-nitro-o-toluenesulfonic acid in an aqueous alkaline medium. Its reaction with reducing agents such as glucose or sodium sulfide leads to Direct Orange 15 (C.I. 40002 or 40003). These dyes are mixtures of dyes of a certain constitution. Reducing Direct Yellow 11 substoichiometrically with regard to the nitrotoluenesulfonic acid gives dye mixtures having a yellowing orange hue. This bathochromic shift in the hue is also referred to as the "reddening" of Direct Yellow 11. Such reddening of the hue can also be achieved through thermal treatment of Direct Yellow 11. Partially reddened Direct Yellow 11 shall hereinafter be understood as referring to dyes that are obtainable by reduction or thermal treatment of Direct Yellow 11 and whose hue angle on bleached cellulose is in the range from 55 to 75 in the colour space. The production of these partially reddened Direct Yellow 11 dyes is described in EP-A 1 548 069, the contents of which are hereby expressly incorporated herein by reference.

Preference is given to dye compositions comprising Direct Yellow 11.

The synthesis of Direct Yellow 11 is common knowledge. Direct Yellow 11 is obtained by heating an alkaline aqueous solution of 5-nitro-o-toluenesulfonic acid. The reaction of the nitrotoluenesulfonic acid with an alkali metal hydroxide such as lithium hydroxide for example first produces the salt of the nitrotoluenesulfonic acid, and it condenses on heating to 40-80° C. in the basic medium to form the azostilbene dye.

Prior to the condensation reaction, the mixture is preferably admixed with an alkanolamine, in an amount of 0.1 to 0.5 mol of alkanolamine per mole of nitrotoluenesulfonic acid. Alkanolamines are for example ethanolamine, isopropanolamine or preferably diethanolamine. It is believed that such an addition has a solubilizing effect on reaction intermediates.

After condensation and cooling, the alkaline mixture is adjusted to a pH in the range from 7 to 9 with acetic acid for example.

In a further preferred embodiment, Direct Yellow 11 is chosen as diethanolamine salt, as described in EP-A-0 122 224, expressly incorporated herein by reference.

The red and blue direct dyes are each an anionic direct-dyeing dye. Blue refers to an absorption maximum in the wavelength range from 560 to 650 nm. Red refers to an absorption maximum in the wavelength range from 490 to 540 nm.

Preference is given to blue direct dyes such as Direct Violet 9 (C.I. 27855), Direct Violet 35, Direct Violet 51 (C.I. 27905), Direct Blue 86 (C.I. 74180), Direct Blue 199 (C.I. 74190), Direct Blue 218 (C.I. 24401), Direct Blue 267, Direct Blue 273, Direct Blue 279, Direct Blue 281, Direct Blue 71, 273 as copper complex, and 290. Particular preference is given to Direct Blue 15, 71, 273, 279, 281, 290 and the dyes of the formulae I, II and III.

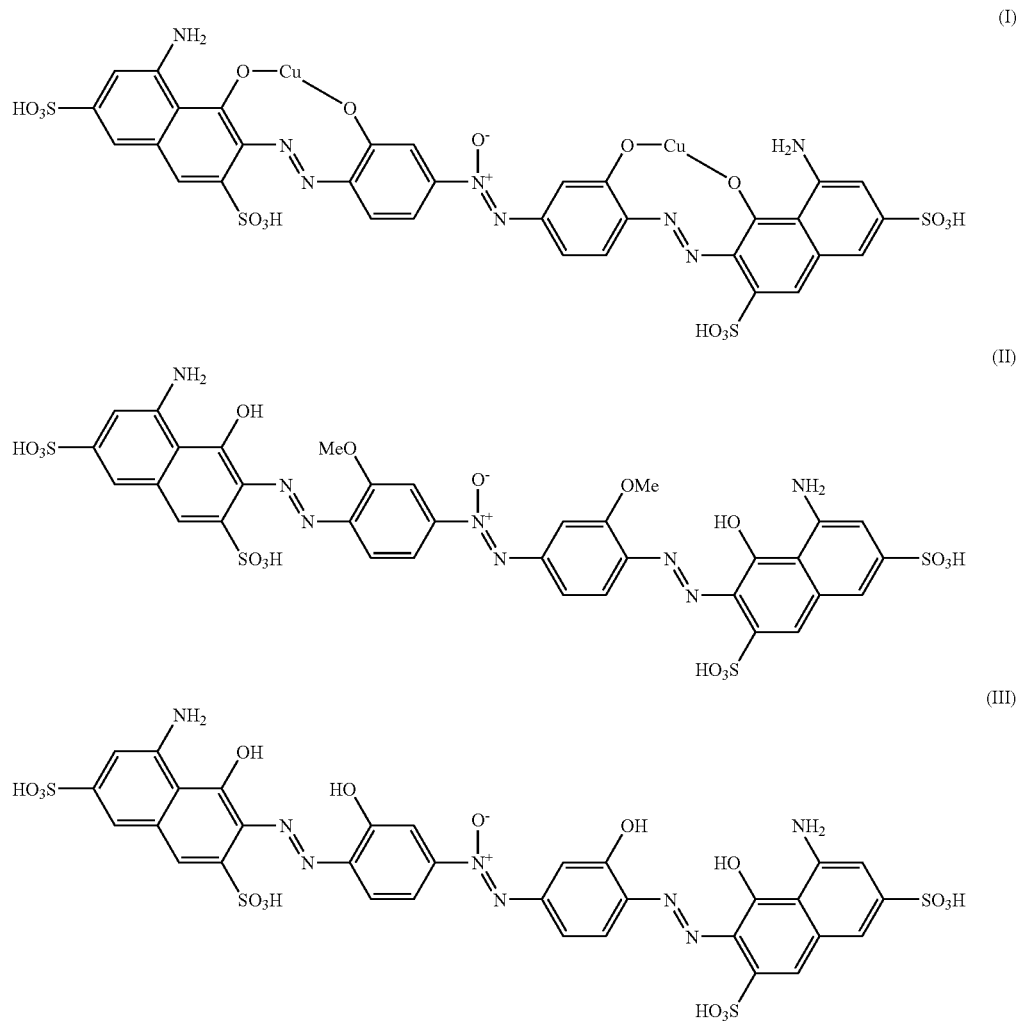

Preference is likewise given to red direct dyes such as Direct Red 80, Direct Red 81 (C.I. 28160), Direct Red 239, Direct Red 252-255 and Direct Red 262.

Preference is given to aqueous liquid formulations whose dye composition consists of

| | |
|---|---|
| 25-85% by weight of | Direct Brown 44 |
| 15-75% by weight of | Direct Yellow 11 |
| 0-15% by weight of | one or more blue direct dyes and |
| 0-10% by weight of | one or more red direct dyes | all based on the dye composition.

Particular preference is given to aqueous liquid formulations whose dye composition consists of

| | |
|---|---|
| 30-80% by weight of | Direct Brown 44 |
| 20-70% by weight of | Direct Yellow 11 |
| 0-15% by weight of | one or more blue direct dyes and |
| 0-10% by weight of | one or more red direct dyes | all based on the dye composition.

Very particular preference is given to aqueous liquid formulations whose dye composition consists of

| | |
|---|---|
| 30-80% by weight of | Direct Brown 44 |
| 20-70% by weight of | Direct Yellow 11 |
| 0-15% by weight of | one or more blue direct dyes preferably selected from Direct Blue 15, 71, 273, 279, 281, 290 and the dyes of the formulae I, II and III | all based on the dye composition.

In accordance with the present invention, the aqueous liquid formulation comprises at least one alkylamine whose one, two or three alkyl radicals may each be substituted by one or two hydroxyl groups and/or amino groups and/or interrupted by one or two oxygen atoms in ether function, in an amount of 0.5-15% by weight based on the total weight of the liquid formulation. Preference is given to alkylamines whose two or three alkyl radicals may each be substituted by one or two hydroxyl groups and/or interrupted by one or two oxygen atoms in ether function. Particular preference is given to mono-, di- and trialkanolamines.

Preferred alkylamines are ethanolamine, diethanolamine, triethanolamine, dimethylethanolamine, N-methyldiethanolamine, monomethylethanolamine, 2-(2-aminoethoxy)ethanol, aminoethylethanolamine. Particular preference is given to ethanolamine especially diethanolamine and triethanolamine.

Preference is given to aqueous liquid formulations comprising 5-30% by weight and preferably 10-30% by weight of dye composition and 0.5% to 10% by weight and especially 0.5% to 8% by weight of one or more alkylamines based on the total weight of the liquid formulation.

The dyes may be utilized as a liquid formulation, as a moist presscake or else in dried form. In the last two cases, a solution is prepared by adding the alkylamine. A portion of the alkylamine included in the liquid formulation may be added, as mentioned above, in the course of the synthesis of the Direct Yellow 11. Care must merely be taken to ensure that the total amount of 15% by weight of alkylamine in the liquid formulation is not exceeded.

In accordance with the present invention, the sodium content of the liquid formulation must not exceed 0.3% by weight. Preference is given to a sodium content of ≦0.25% by weight, especially of ≦0.2% by weight. In general, the sodium content of the liquid formulation is due to the Direct Brown 44 used, generally as a liquid formulation. It is therefore advantageous to choose liquid formulations of Direct Brown 44 which were synthesized by the methods described above.

Further additives in the liquid formulation can be in principle $C_1$-$C_4$-alkanols, for example methanol, ethanol, propanol, isopropanol, butanol, isobutanol, sec-butanol or tert-butanol, carboxamides, such as N,N-dimethylformamide or N,N-dimethylacetamide, ketones or keto alcohols, such as acetone, methyl ethyl ketone or 2-methyl-2-hydroxypentan-4-one, mono-, oligo- or polyalkylene glycols or -thioglycols which have $C_2$-$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol, other polyols, such as glycerol or hexane-1,2,6-triol, $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl ether or triethylene glycol monoethyl ether, $C_1$-$C_4$-alkyl esters of polyhydric alcohols, γ-butyrolactone or dimethyl sulfoxide. Suitable solubilizing additives are further lactams, such as ε-caprolactam, pyrrolidin-2-one or N-methylpyrrolidin-2-one, cyclic ureas, such as 1,3-dimethylimidazolidin-2-one or 1,3-dimethylhexahydropyrimid-2-one, and also polyacrylic acids, polyacrylic acid derivatives, polyvinyl acetates, polyvinyl alcohols, polyvinylpyrrolidones, polysiloxanes or copolymers of the respective monomers. It is further possible to use oligomers of ethylene oxide or propylene oxide or derivatives of these oligomers.

Preference is given to liquid formulations comprising no poly-N-vinylformamide and/or no polymer obtained by polymerization of a mixture of one or more ethylenically unsaturated monomers and >50% by weight of N-vinylformamide based on total monomers. Poly-N-vinylformamide herein is a polymer having an average molecular weight (static scattering of light) in the range of ≦340 000. It is obtained by free radical polymerization of vinylformamide as described in DE-A 31 28 478. It is in the nature of the polymer's preparation and also in the nature of an aqueous liquid formulation that hydrolysis of amide to amine groups is not completely avoidable. Polyvinylformamide herein accordingly refers to a polymer comprising up to 20 mol % of hydrolyzed groups. The degree of hydrolysis is simple to determine by polyelectrolyte titration. Useful ethylenically unsaturated comonomers include for example vinyl formate, vinyl acetate, vinyl propionate, acrylonitrile, N-vinylcaprolactam, N-vinylurea, N-vinylpyrrolidone, $C_1$- to $C_6$-alkyl vinyl ether, N-vinylacetamide, methyl acrylate and methyl methacrylate.

| Particular preference is given to present invention aqueous liquid formulations comprising | |
|---|---|
| 15-30% by weight | of the dye composition, |
| 0.5-8% by weight | of mono-, di- and/or triethanolamine, preferably di- and/or triethanolamine. |
| Particular preference is given to present invention aqueous liquid formulations comprising | |
| 15-30% by weight | of the dye composition, |
| 0.5-8% by weight | of mono-, di- and/or triethanolamine, preferably di- and/or triethanolamine. |

The liquid formulations obtained produce in all mixing ratios of Direct Brown 44 with Direct Yellow 11 stable mixtures not only with but also without inclusion of a blue component and/or if appropriate a red component and thus provide a wide coloristic spectrum of browns. The solutions obtained have excellent stability in storage and have not structural viscosity. They provide good paper and board coloration especially in the pulp.

The examples which follow illustrate the invention.

a) Preparation of Direct Yellow 11 (DY 11)

To 1.5 l of water were added 1.10 kg of 5-nitro-o-toluenesulfonic acid (83% by weight, 33.5 mol). A total of 278 g of solid lithium hydroxide (56% pure by weight) were then added a little at a time. 67 g of diethanolamine were added and the mixture was stirred at 50-60° C. for 20 hours and then at 58° C. for 5 hours. Thereafter 1.7 liters of water were added and a pH of 9.0 was set with glacial acetic acid. The gellike dye was dissolved with 1.85 kg of urea and adjusted to final color strength with water. The product was obtained in an amount of 7.26 kg and had a dye content of about 12% by weight.

b) Preparation of Direct Brown 44 (DB 44)

Stage 1:

To 344 ml of water were added 28.12 g of m-phenylenediamine and 8.76 g of 20% by weight hydrochloric acid. Ice was added in an amount of 338 g. Then, 15.04 g of sodium nitrite were introduced, followed by the dropwise addition within 50 minutes of 78.86 g of 20% by weight hydrochloric acid at <3° C. After 10 minutes a further 1.73 g of m-phenylenediamine was added and a pH of 3 was set with 13 g of aqueous sodium hydroxide solution (25% by weight). This was followed by stirring at 3° C. for 1 hour.

Stage 2:

To a solution of 34.6 g of sulfanilic acid in 273.46 g of water and 32.4 g of aqueous sodium hydroxide solution (25% by weight) were added 279 g of ice and 68.9 g of sodium nitrite. The mixture was admixed with 82.76 g of hydrochloric acid (20% by weight) at 0-5° C. and subsequently stirred for 30 minutes.

Stage 2 was combined with stage 1 at 20° C. in the course of 90 minutes. All the while, the pH was maintained at pH 5 with aqueous sodium hydroxide solution (25% by weight). After 3 hours at 20° C. the batch was adjusted to pH 7.5 and then heated to 55-60° C. Hydrochloric acid (20% by weight) was used to adjust the pH to 1, and the solids were filtered off with suction and washed with water to obtain about 300 g of a moist presscake of Direct Brown 44 whose solids content was 22% by weight (sodium content: <0.5% by weight in the dry material).

c) Production of a Liquid Formulation of Direct Brown 44 (B1)

80.33 g of the most presscake (corresponding to 20.0 g dry) were dissolved with 5.25 g of diethanolamine, 3.44 g of ammoniacal water (25%), 5 g of polyethylene glycol (average molecular weight: 200) and water to form 100 g of liquid dye.

The Direct Brown 44 liquid formulations reported in Table 1 (B1-B9, and also the comparative browns V1 and V2), the Direct Yellow 11 prepared according to Example a) and Direct Blue 279 were mixed to produce the liquid formulations recited in Table 2. The individual dyes are reported in parts by weight of dye (as solid) based on the total dye composition. The % ages are unless stated otherwise weight % ages and are based on the liquid formulation.

The storage stability of these inventive liquid formulations of Examples 1-16 and of Comparative Examples V1-V3 was assessed after 5 weeks by visual inspection according to the following key: 0=no sediment, 1=very little sediment, 2=marked precipitation, 3=pronounced precipitation.

We claim:

1. An aqueous liquid formulation comprising
   5-30% by weight of a dye composition comprising
   25-85% by weight of Direct Brown 44
   15-75% by weight of Direct Yellow 11 and/or of a dye obtainable by reduction or thermal treatment of Direct Yellow 11
   0-15% by weight of one or more blue direct dyes and
   0-10% by weight of one or more red direct dyes
   all based on the dye composition, and
   0.5-15% by weight of one or more alkylamines whose one, two or three alkyl radicals may each be substituted by one or two hydroxyl groups and/or amino groups and/or interrupted by one or two oxygen atoms in ether function,
   based on the total weight of the aqueous liquid formulation, the sodium content of the liquid formulation not exceeding 0.3% by weight.

2. The aqueous liquid formulation according to claim 1 whose dye composition consists of
   25-85% by weight of Direct Brown 44
   15-75% by weight of Direct Yellow 11

TABLE 1

Liquid formulations of Direct Brown 44

| Formulation | NaOH 50% [g] | Diethanolamine DEA [g] | Triethanolamine TEA [g] | Ethanolamine EA [g] | Ammoniacal water 25% [g] | Polyethylene glycol PEG 200 [g] | PH |
|---|---|---|---|---|---|---|---|
| B1 |  | 5.25 |  |  | 3.44 | 5 | 9.8 |
| B2 |  |  | 7.46 |  | 3.44 | 5 | 9.1 |
| B3 |  |  | 6.78 |  | 1.74 | 5 | 8.4 |
| B4 |  |  |  | 2.78 | 1.74 | 5 | 9.7 |
| B5 |  |  | 7.54 |  | 3.44 | 0 | 9.1 |
| B6 |  | 1.77 |  |  | 3.44 | 0 | 9.1 |
| B7 |  |  | 4.19 |  | 3.44 | 0 | 8.7 |
| B8 |  |  |  | 3.09 | 3.44 | 0 | 10.0 |
| B9 |  |  |  | 1.03 | 3.44 | 0 | 9.0 |
| V1 | 4.04 |  | 7.46 |  |  | 5 | 12.0 |
| V2 | 2.02 |  | 7.46 |  |  | 5 | 9.5 |

PEG 200 is a polyethylene glycol having an average molecular weight of 200 g/mol.

TABLE 2

| Ex. | DB44 | DB44 parts by weight | DY11 parts by weight | D. Blue 279 parts by weight | Dye total [%] | EA [%] | DEA [%] | TEA [%] | NH3 [%] | PEG200 [%] | Na [%] | Storage stability 4° C. | Storage stability 50° C. |
|---|---|---|---|---|---|---|---|---|---|---|---|---|---|
| 1 | B1 | 58.8 | 41.2 | 0.0 | 16.0 | — | 3.13 | — | 0.43 | 2.50 | 0.10 | 1 | 1 |
| 2 | B2 | 74.4 | 25.6 | 0.0 | 17.4 | — | 0.33 | 4.97 | 0.58 | 3.35 | 0.11 | 1 | 1 |
| 3 | B2 | 64.9 | 22.4 | 12.8 | 18.4 | — | 0.31 | 4.62 | 0.54 | 3.10 | 0.14 | 1 | 1 |
| 4 | B3 | 50.9 | 35.6 | 13.4 | 17.0 | — | 0.46 | 3.14 | 0.20 | 2.31 | 0.11 | 1 | 1 |
| 5 | B3 | 64.9 | 22.4 | 12.8 | 18.4 | — | 0.31 | 4.21 | 0.27 | 3.10 | 0.14 | 1 | 1 |
| 6 | B4 | 58.8 | 41.2 | 0.0 | 16.0 | 1.39 | 0.50 | — | 0.22 | 2.50 | 0.10 | 1 | 1 |
| 7 | B4 | 64.9 | 22.4 | 12.8 | 18.4 | 1.86 | 0.31 | — | 0.27 | 2.31 | 0.14 | 1 | 1 |
| 8 | B5 | 35.4 | 50.4 | 14.2 | 15.64 | — | 0.62 | 2.30 | 0.26 | 0.00 | 0.13 | 1 | 1 |
| 9 | B5 | 64.9 | 22.4 | 12.8 | 18.4 | — | 0.31 | 4.67 | 0.53 | 0.00 | 0.14 | 1 | 1 |
| 10 | B6 | 58.8 | 41.2 | 0.0 | 16.0 | — | 1.39 | — | 0.43 | 0.00 | 0.10 | 1 | 1 |
| 11 | B6 | 35.4 | 50.4 | 14.2 | 15.64 | — | 1.16 | — | 0.26 | 0.00 | 0.13 | 1 | 1 |
| 12 | B7 | 74.4 | 25.6 | 0.0 | 17.4 | — | 0.33 | 2.80 | 0.58 | 0.00 | 0.11 | 1 | 1 |
| 13 | B7 | 50.9 | 35.6 | 13.4 | 17.0 | — | 0.50 | 1.94 | 0.40 | 0.00 | 0.11 | 1 | 1 |
| 14 | B8 | 58.8 | 41.2 | 0.0 | 16.0 | 1.54 | 0.50 | — | 0.43 | 0.00 | 0.10 | 1 | 1 |
| 15 | B8 | 50.9 | 35.6 | 13.4 | 17.0 | 1.42 | 0.47 | — | 0.40 | 0.00 | 0.11 | 1 | 1 |
| 16 | B9 | 58.8 | 41.2 | 0.0 | 16.0 | 0.52 | 0.50 | — | 0.43 | 0.00 | 0.10 | 1 | 1 |
| 17 | B9 | 35.4 | 50.4 | 14.2 | 15.64 | 0.34 | 0.67 | — | 0.26 | 0.00 | 0.13 | 1 | 1 |
| VV1 | V1 | 58.8 | 41.2 | 0.0 | 16.0 | — | 0.50 | 3.73 | — | 2.50 | 0.58 | 2 | 3 |
| VV2 | V1 | 50.9 | 35.6 | 13.4 | 17.0 | — | 0.50 | 3.45 | — | 2.31 | 0.54 | 3 | 3 |
| VV3 | V2 | 74.4 | 25.6 | 0.00 | 18.4 | — | 0.33 | 5.0 | — | 3.35 | 0.79 | 2 | 2 |

0-15% by weight of one or more blue direct dyes and 0-10% by weight of one or more red direct dyes all based on the dye composition.

3. The aqueous liquid formulation according to claim 1 wherein the whose dye composition consists of 30-80% by weight of Direct Brown 44

20-70% by weight of Direct Yellow 11

0-15% by weight of one or more blue direct dyes and 0-10% by weight of one or more red direct dyes all based on the dye composition.

4. The aqueous liquid formulation according to claim 1 wherein the alkylamine is selected from the group consisting of ethanolamine, diethanolamine, triethanolamine, dimethylethanolamine, N-methyldiethanolamine, monomethylethanolamine, 2-(2-aminoethoxy)ethanol and aminoethylethanolamine.

5. The aqueous liquid formulation according to claim 1 wherein the amount of the alkylamine is 0.5-10% by weight based on the total weight of the liquid formulation.

6. The aqueous liquid formulation according to claim 1, wherein the sodium content is $\leqq 0.25\%$ by weight.

7. The aqueous liquid formulation according to claim 1 that comprises 15-30% by weight of dye composition, and 0.5-8% by weight of mono-, di- and/or triethanolamine.

8. A method for dyeing paper and board comprising the use of the aqueous liquid formulation according to claim 1.

* * * * *